United States Patent [19]

Maier

[11] 4,122,708
[45] Oct. 31, 1978

[54] CAPACITIVE PROXIMITY SENSORS

[75] Inventor: Lawrence C. Maier, Middlebury, Vt.

[73] Assignee: Simmonds Precision Products, Inc., Tarrytown, N.Y.

[21] Appl. No.: 672,481

[22] Filed: Mar. 31, 1976

[51] Int. Cl.² .............................................. G01L 3/10
[52] U.S. Cl. .................... 73/136 A; 73/660; 324/61 R
[58] Field of Search ............... 317/246, DIG. 2; 324/61 R, 166; 328/5; 340/200; 73/136 A, 71.4

[56] References Cited

U.S. PATENT DOCUMENTS

| | | | |
|---|---|---|---|
| 2,842,738 | 7/1958 | Warnick | 324/61 R |
| 3,048,775 | 8/1962 | Calvert | 73/71.4 X |
| 3,132,520 | 5/1964 | Wing | 73/516 R X |
| 3,146,394 | 8/1964 | Frisch | 324/166 X |
| 3,221,256 | 11/1965 | Walden | 340/200 X |
| 3,261,210 | 7/1966 | Buchold | 73/517 B |
| 3,487,402 | 12/1969 | Hillhouse | 73/136 A X |
| 3,515,987 | 6/1970 | Zurbrick et al. | 324/61 R |
| 3,732,553 | 5/1973 | Hardway | 340/200 |
| 3,882,381 | 5/1975 | Gregory | 324/61 R |

*Primary Examiner*—James J. Gill
*Attorney, Agent, or Firm*—Edwin E. Greigg

[57] ABSTRACT

A capacitive proximity sensor for use in hostile environments comprises a ceramic substrate, and two conductive regions formed on the substrate and having opposed edges defining a narrow gap therebetween. The gap configuration is such as to maximize the fringing of electric flux lines outwards from the substrate when one conductive region is energized from a high frequency source. The other conductive region is connected to remotely located signal conditioner operative to maintain said other region at virtual ground and thereby eliminate signal error due to cabling capacitances. On approach of a flux-shielding body to the sensor, the sensor output current to the signal conditioner will decrease as a function of the proximity of the body. The sensor can be used as a simple proximity sensor or incorporated in a shaft torque measurement system operative down to zero r.p.m.

5 Claims, 7 Drawing Figures

CAPACITIVE PROXIMITY SENSORS

BACKGROUND OF THE INVENTION

1. Field of the Invention

This invention relates to capacitive proximity sensors for use in adverse engine environments such as, for example, the turbine section of a jet engine, and to proximity sensing and torque measurement systems incorporating such sensors.

2. Description of the Prior Art

There has previously been proposed a capacitive proximity sensor for operation under normal environmental conditions which detects the presence or absence of a liquid or solid in the immediate surrounds of the sensor. The electronic circuitry associated with the sensor is arranged adjacent thereto which avoids interference problems due to cabling between a sensor and remotely located associated circuitry.

Such a previously proposed arrangement is not, however, suitable for applications in hostile environments which demand a rugged sensor construction, a relative insensitivity of the sensor to environmental changes, remote location of the associated circuitry, and interference-free connection between the sensor and its associated circuitry. One typical such application is the measurement of the blade/shroud gap in the turbine section of a jet engine.

It has also been proposed to measure the torque transmitted by a shaft, for example a ships propeller shaft, by a magneto-strictive method. However, such a method is incompatible with the use of non-magnetic metals, is very sensitive to temperature variations, requires bulky equipment, and has low resolution.

It is therefore an object of the invention to provide an improved capacitive proximity sensor capable of operating in adverse environmental conditions. It is a further object of the invention to provide such a sensor for use in proximity sensing and torque measurement systems.

SUMMARY OF THE INVENTION

According to the invention, there is provided a capacitive proximity sensor, comprising a ceramic substrate and first and second conductive regions formed on the substrate and having opposed edges defining therebetween a narrow gap across which electric flux lines fringe outwards from the substrate when an electric potential is applied between the conductive regions.

According to the invention, there is also provided a sensing system comprising a capacitive proximity sensor comprising a non-conductive substrate, and two spaced conductive regions formed on the substrate and having opposed edges defining therebetween a narrow gap across which electric flux lines fringe outwards from the substrate when a potential is applied between the regions, a high frequency source connected to supply an alternating potential to one said sensor conductive region, a signal conditioner remotely-located from the sensor and comprising means for maintaining an input of the conditioner at virtual ground, and means for amplifying and outputting a signal fed to the said conditioner input, and cabling connecting the other said conductive region of the sensor to the said conditioner input whereby to feed a current signal thereto, the magnitude of said current signal being dependent on the proximity of a flux-shielding body to the sensor, and independent of cabling capacitances due to virtual grounding of the conditioner input.

According to the invention, there is further provided a torque measurement system for measuring the torque transmitted by a shaft, comprising first and second regions of varied radius spaced along the said shaft, first and second capacitive proximity sensors non-rotatably mounted opposite the first and second regions of varied radius respectively and each comprising a non-conductive substrate and two spaced conductive regions formed on the substrate and having opposed edges defining therebetween a narrow gap across which electric flux lines fringe outwards from the substrate into the path of the corresponding said varied radius region when a potential is applied between the said conductive regions, high frequency source means connected to supply an alternating potential to one said conductive region of each sensor, first and second signal conditioners connected to the other said conductive region of the first and second sensors respectively whereby to produce respective output signals modulated in dependence upon the degree of shielding of the flux lines extending between the conductive regions of their corresponding sensors by the said varied radius regions associated with those sensors, and comparator means connected to receive and compare said modulated output signals whereby to produce a signal indicative of the relative phase of the modulated signals, said relative phase being a function of the shaft twist between said varied-radius regions and thereby representative of the torque transmitted by the shaft.

BRIEF DESCRIPTION OF THE DRAWINGS

Embodiments of the invention will now be described, by way of example, with reference to the accompanying diagrammatic drawings, in which.

DESCRIPTION OF THE PREFERRED EMBODIMENTS

Figure 1:
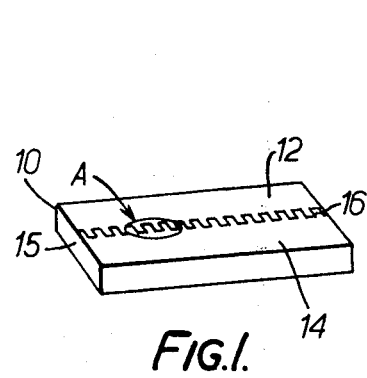
FIG. 1 is a plan view of a capacitive proximity sensor embodying the invention.
Figure 2:
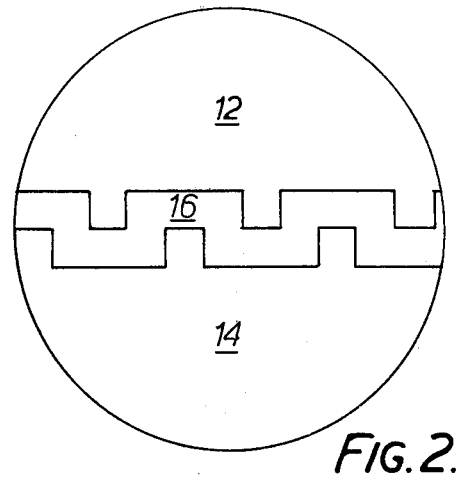
FIG. 2 is an enlarged view of the circled portion A of FIG. 1.

As shown in FIG. 1, the capacitive proximity sensor 10 basically comprises two conductive regions or areas 12 and 14 formed on a ceramic substrate 15 and spaced from each other by a narrow gap 16 to form a capacitor. The conductive areas 12 and 14 can be formed on the substrate (for example a G.10 glass epoxy printed circuit board) in a desired configuration by any suitable method such as, for example, by etching 20z copper mounted on the substrate or by evaporating a metal film onto the masked substrate. The gap pattern (FIG. 2) is such that fringing of electric field flux lines between the areas 12 and 14 is maximized; for the tooth pattern shown in FIG. 2 the width of the gap 16 and also of each conductive tooth is typically 0.010 inches, in which case the tooth spacing is 0.030 inches. Once the conductive areas 12 and 14 have been formed, the sensor face can be glass coated and polished to prevent sensor damage due to adverse environmental conditions such as high temperature and high velocities particles. The completed sensor 10 typically measures 1.00 by 0.50 inches.

The sensor 10 is generally intended for operation in environments incompatible with electronic signal conditioning circuitry. Thus a signal conditioner for the sensor will need to be remotely located and a suitable form of signal conditioner 17 is shown in FIG. 3.

Figure 3:
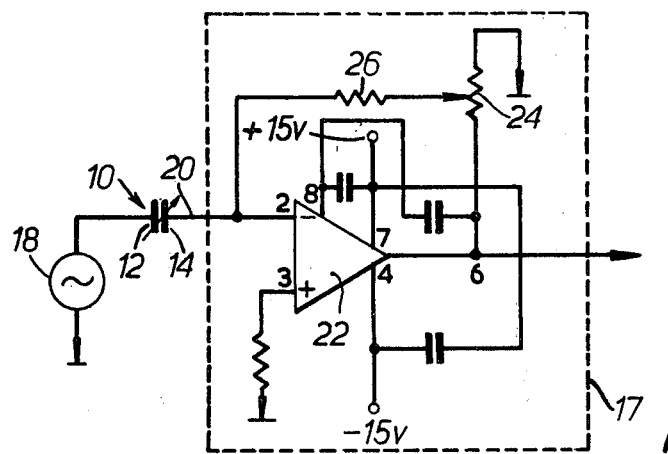
FIG. 3 is a circuit diagram of a remotely located signal conditioner for the sensor of FIG. 1.

As can be seen from FIG. 3, one conductive area 12 of the sensor 10 is supplied from a high frequency source 18 (for example 80 kHz, 10 volts peak-to-peak), and the other conductive area 14 of the sensor 10 is connected by a cable 20 to the signal conditioner input. The signal conditioner 17 comprises a high gain, high frequency amplifier 22 (for example, an AD507 integrated circuit amplifier connected in a feedback configuration via an adjustable resistor 24 and resistor 26 whereby to hold its input (and thus the conductive area 14) at virtual ground. The signal output of the sensor 10 is in the form of a current. Since there is no voltage variation with respect to ground along the cable 20, any cable capacitance or change in cable capacitance to ground will not affect the sensor current.

The sensor current is a function of the electric field flux passing between the conductive areas 12 and 14 and the amount of this flux will vary in dependence upon the proximity of conductive or electrically charged bodies. Variations in sensor current will appear at the output of the signal conditioner 17 as modulations of the high frequency signal supplied to the sensor 10.

The resistor 24 can be adjusted to vary the gain of the amplifier 22.

Figure 4:
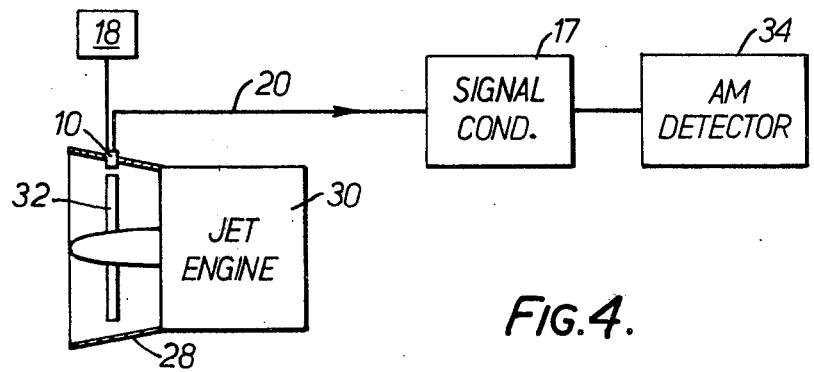
FIG. 4 is a block diagram of a turbine-blade proximity sensing system embodying the invention.
Figure 5:
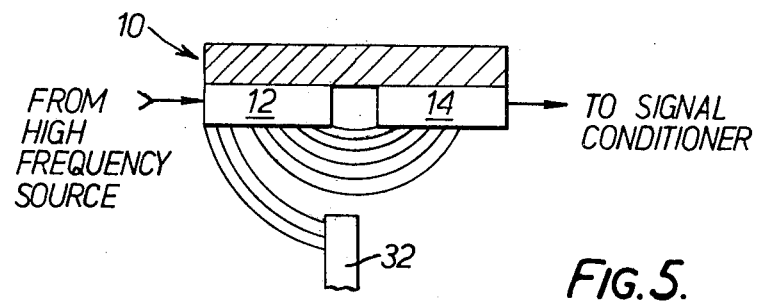
FIG. 5 is a sectional view through part of a turbine showing the relation between a turbine blade and the sensor of the proximity sensing system of FIG. 4.

The turbine-blade proximity sensing system shown in FIG. 4 incorporates a capacitive proximity sensor 10 and signal conditioner 17 as shown in FIGS. 1 and 3 respectively. The sensor 10 is mounted within the turbine housing 28 of a jet engine 30 in the plane of the turbine blades 32. The mutual disposition of the sensor 10 and a blade 32 is more clearly illustrated in FIG. 5.

When no blades 32 are aligned opposite the sensor 10 a large number of electric flux lines connect the conductive area 12 to the virtual ground conductive area 14, and in this condition the output of the signal conditioner 17 is an unmodulated high frequency signal of a reference magnitude. As a turbine blade 32 approaches the sensor 10, the electrical mass of the blade is such that it does not change appreciably in voltage when the available charge from the sensor is applied to it, and hence the blade 32 acts as a grounded metal plate even if electrical continuity to earth is not especially good. The blade 32 will thus function as a grounded metal shield (a Faraday shield) such that as the blade 32 approaches the sensor 10, some of the flux lines that would normally have passed from the area 12 to the area 14 now pass from the conductive area 12 to the 'grounded' turbine blade 32. The loss of these connecting flux lines between the sensor areas 12 and 14 represents a loss of current flow across the sensor 10 which manifests itself at the output of the signal conditioner 17 as a decrease in signal magnitude.

Figure 6:
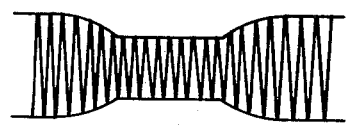
FIG. 6 shows a typical output waveform from a signal conditioner of the proximity sensing system of FIG. 4.

The number of interrupted flux lines is proportional to the distance between the sensor 10 and the blade 32. The closer the blade 32 is to the sensor 10, the greater the number of interrupted flux lines and, therefore, the smaller the magnitude of the signal conditioner output is amplitude-modulated with a percentage modulation proportional to the blade proximity to the sensor. A typical conditioner output waveform is shown in FIG. 6.

The output of the signal conditioner 17 is demodulated by a standard A.M. detector 34. The resultant pulse peak can be detected to give a D.C. voltage proportional to blade proximity to the sensor 10.

Using a sensor energized from a 80 kHz, 10v pp source and having the dimensions given hereinbefore by way of example, a signal modulation of 42.86% was achieved at a sensor/blade gap of 0.002 inches. This modulation decreased to 0% with the sensor at infinity.

Taking the peak magnitude of the signal conditioner output signal as a zero reference with a blade at its point of closest approach to the sensor, the relationship between the peak output signal magnitude $E_{cp}$ and the sensor-blade distance is given by:

$$E_{cp} = (1n \text{ (distance)} - \gamma)/\beta$$

where $\gamma$ and $\beta$ are constants determined by the magnitude and frequency of the high frequency source energizing the sensor and by the sensor configuration.

The described turbine-blade proximity sensing system can be advantageously used in the control of the blade/shroud gap in a jet engine.

Figure 7:
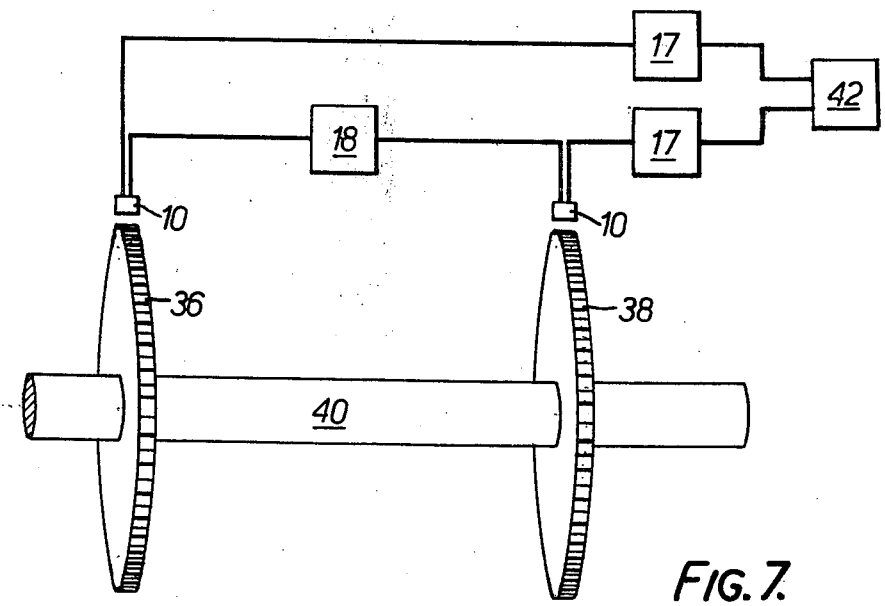
FIG. 7 is a schematic representation of a torque measurement system embodying the invention.

The torque measurement system illustrated in FIG. 7 comprises two capacitive proximity sensors 10 of the FIG. 1 form. Each sensor 10 is arranged adjacent a respective one of two toothed wheels 36 and 38 which are spaced along and secured to a shaft 40. The sensors 10 are energized from a high frequency source 18 and each sensor feeds a respective signal conditioner 17. Upon rotation of the shaft 40, the output of each conditioner 17 varies in magnitude as the teeth of the corresponding tooth wheel 36 or 38 passes beneath the sensor 10 connected to that conditioner 17. By comparing in a phase comparator 42 the phases of the two modulated signals outputted from the conditioners 17, a signal proportional to the twist in the shaft can be obtained. This twist signal is proportional to the torque being transmitted by the shaft 40.

The system shown in FIG. 7 is capable of measuring the torque transmitted by a static shaft since the output of each signal conditioner is proportional to the degree of overlap between a tooth of a toothed wheel and its associated sensor and is not merely a two-state output. The torque measurement system can therefore be calibrated at zero shaft RPM such that a measured phase displacement between the signal conditioner outputs would correspond to a known shaft torque.

The described torque measurement system is compatible with torque measurement in hostile engine environments since the only elements exposed to such an environment would be the two sensors and the two toothed wheels. The described system can be advantageously used in very low speed situations such as shipboard use and also in situations where a shaft can develop considerable torques without rotating.

What is claimed is:
1. A sensing system arranged to sense the proximity of jet engine turbine blades to their housing, comprising:
   a capacitive proximity sensor comprising a non-conductive substrate, and two spaced conductive regions on the substrate and having opposed edges defining therebetween a narrow gap across which electric flux lines fringe outwards from the substrate when a potential is applied between the regions;

a high frequency source connected to supply an alternating potential to one said sensor conductive region; and a signal conditioner remotely located from the sensor, and cabling connecting the other said conductive region of the sensor to the conditioner input, said signal conditioner comprising means for maintaining an input of the conditioner at virtual ground, and means for amplifying and outputting a signal fed to the conditioner input, whereby the magnitude of a current signal feed to the conditioner input is dependent on the proximity of a flux-shielding body to the sensor, and independent of cabling capacitances due to virtual grounding of the conditioner input, and wherein the sensor is mounted within the turbine housing in alignment with a set of turbine blades, and wherein each of the turbine blades serves as a flux-shielding body.

2. A system according to claim 1, in which said means for maintaining the conditioner input at virtual ground and said amplifier means are combined and comprise a high gain amplifier connected in a feed back arrangement.

3. A system according to claim 1, including means connected to receive and demodulate the signal outputted from the signal conditioner whereby to obtain a d.c. signal dependent on the proximity of the body to the sensor gap.

4. A system according to claim 1, in which the gap is of the order of 0.01 inches.

5. A torque measurement system for measuring the torque transmitted by a shaft, comprising first and second electrically conductive regions of varied radius spaced along the shaft, first and second capacitive proximity sensors non-rotatably mounted opposite the first and second regions of varied radius, respectively, and each comprising a non-conductive substrate and two spaced conductive regions on the substrate having opposed edges defining therebetween a narrow gap across which electric flux lines fringe outwards from the substrate into the path of the corresponding varied radius region when a potential is applied between the conductive regions, high frequency source means connected to supply an alternating potential to one said non-conductive region of each sensor, first and second signal conditioners connected to the other said conductive region of the first and second sensors, respectively, whereby to produce respective output signals modulated in dependence upon the degree of shielding of the flux lines extending between the conductive regions of their corresponding sensors by the varied radius regions associated with those sensors, each said signal conditioner being remotely located from its associated sensor and comprising means for maintaining said other region of the sensor at virtual ground, whereby to eliminate errors due to cabling capacitance between the sensor and signal conditioner, and comparator means connected to receive and compare said modulated output signals, whereby to produce a signal indicative of the relative phase of the modulated signals, said relative phase being a function of the shaft twist between said varied radius regions and thereby representative of the torque transmitted by the shaft.

* * * * *